United States Patent [19]
Eknes

[11] 3,794,274
[45] Feb. 26, 1974

[54] AIRCRAFT STRUCTURE TO REDUCE SONIC BOOM INTENSITY

[76] Inventor: Oscar Eknes, 7850 Sunset Blvd., Los Angeles, Calif. 90046

[22] Filed: Dec. 19, 1969

[21] Appl. No.: 886,579

[52] U.S. Cl.............. 244/130, 244/1 N, 244/42 C, 244/53 B, 244/119
[51] Int. Cl. ........................................... B64c 21/02
[58] Field of Search... 244/1 N, 130, 119, 121, 225, 244/126, 42 C, 42 CE, 42 CF, 53 B; 137/15.1

[56] References Cited
UNITED STATES PATENTS

| | | | |
|---|---|---|---|
| 3,161,377 | 12/1964 | Balluff............................. | 244/42 X |
| 3,314,629 | 4/1967 | Rethorst........................... | 244/12 X |
| 3,369,776 | 2/1968 | Puryear............................ | 244/53 CF |
| 3,467,348 | 9/1969 | Lemelson........................... | 244/130 |
| 2,931,167 | 4/1960 | Leduc................................ | 244/1 N |

OTHER PUBLICATIONS
"Sonic Boom Considerations in Aircraft Design" Howell, Clarence S. et al. Agard Aircraft Engine Noise & Sonic Boom, May 1969

Primary Examiner—Trygve M. Blix
Assistant Examiner—Gregory W. O'Connor

[57] ABSTRACT

The structure of a fuselage of an aircraft having a plurality of apertures therein which permit high pressure air to be received within the confines of the exterior portion of said fuselage, and means within said fuselage adapted to direct and control the flow of said air until the energy thereof has been substantially reduced or same is emitted through carefully situated ports. The effective cross-sectional area of the nose portion of said fuselage is thereby substantially reduced so as to cause a similar reduction of the drag upon said aircraft.

6 Claims, 9 Drawing Figures

PATENTED FEB 26 1974 3,794,274

INVENTOR.
OSCAR EKNES

BY Bernard M. Smukler
ATTORNEY

AIRCRAFT STRUCTURE TO REDUCE SONIC BOOM INTENSITY

This invention relates in general to an arrangement of parts for use in connection with aircraft capable of exceeding the speed of sound, and more particularly to the application of a unique structure to the fuselage of such aircraft so as to reduce drag upon said aircraft and to substantially reduce the intensity of the phenomenon known as sonic boom which may be generated by said aircraft. In operation, the said invention, among other things, effectively reduces the surface area of the nose portion of the fuselage by means of establishing thereon a plurality of apertures for receiving high pressure air from the surrounding atmosphere, and then directs said air by means of a series of passageways placed within and along the length of the fuselage until the energy thereof is dissipated or same has been removed from the aircraft in a controlled manner. As a result, drag upon the aircraft and the attendant sonic boom intensity are substantially reduced.

In the rapidly expanding art of supersonic aircraft flights, a common complaint against such flights has been and is the sonic boom effect on large population areas. The present invention substantially advances the art in that it considers the length of the fuselage and the effective cross-sectional area of same, both of which are primary factors in the causation of drag upon the aircraft and the phenomenon known as sonic boom. Generally, a sonic boom may be described as sound energy in the surrounding atmosphere which is trapped due to its supersonic impact at the nose portion of the aircraft. Thus, as the pressure of the sound energy increases upon its entrapment, such atmosphere or air energy finally erupts therefrom as a sonic boom. Further, it has been found that as the drag upon the aircraft decreases, the aero dynamic efficiency of said aircraft increases in direct proportion thereto.

It is, therefore, the primary purpose and object of this invention to provide an aircraft design which substantially reduces sonic boom intensity generated by said aircraft.

Another object of this invention is to reduce the likelihood of any such sonic boom ever reaching the surface of the earth, even if same is actually generated by said aircraft.

An additional object of the present invention is to provide an aircraft design, as described above, which causes a reduction of the drag otherwise placed on said aircraft so that said aircraft may achieve a greater speed than heretofore obtained with a similar energy output.

A further object of the present invention is to provide means which increase zero dynamic efficiency to a degree higher than otherwise presently obtainable by jet aircraft engines.

Another object of the above described invention is to provide greater efficiency in the flight of aircraft capable of supersonic and subsonic flights, even while same are traveling at subsonic speeds.

Other and additional objectives and advantages of this present invention are to provide a design for aircraft which will safely reduce or minimize the drag otherwise experienced by such aircraft; economy of manufacture and operation; and such objectives, advantages and capabilities will be readily apparent and better understood by referring to the following description and claims, taken in conjunction with the accompanying drawing, in which:

Figure 1:
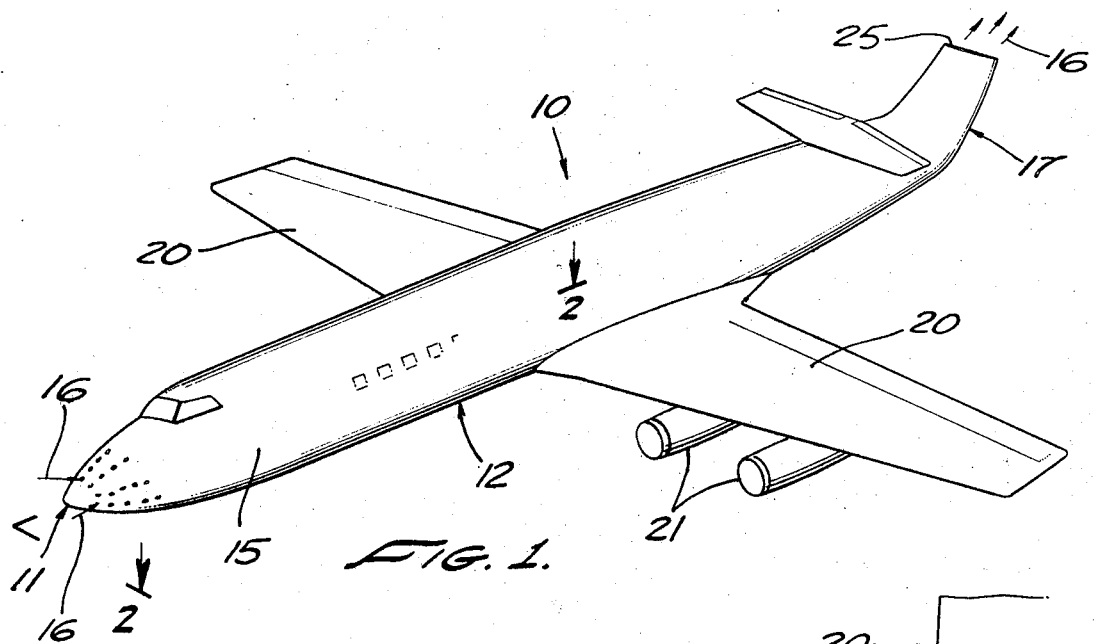
FIG. 1 is a perspective view of an aircraft utilizing the concepts of the present invention.

With reference to the drawing of the invention in detail, it has been found that sonic boom intensity generated by an aircraft 10 is directly proportional to the effective cross-sectional area of its nose 11. Thus, as may be appreciated, said effective cross-sectional area varies with the streamlining of the nose portion 11. If the effective cross-sectional area of the nose 11 of the fuselage 12 is reduced, the intensity of the sonic boom is likewise reduced. In addition to utilizing the normal method of streamlining the nose portion 11 of an aircraft 10 designed to fly at supersonic speeds, the present invention contemplates reducing the effective cross-sectional area of the nose 11 by placing a plurality of apertures 13 at said nose portion 11 and a concentric main venting surface 14 immediately within the skin 15 of said fuselage 12. As may be appreciated by viewing FIGS. 1 and 5 of the drawing, air 16 which is in a state of "overpressure" due to the supersonic speed of the aircraft 10 is channeled inside the fuselage 12 through said apertures 13 until contact with said concentric main venting surface 14, and then flows along the length thereof until exit therefrom at the tail portion 17 thereof.

The pattern of providing apertures 13 is important in determining the degree of reduction of sonic boom intensity. For example, if only one very large aperture was provided at said nose portion 11, it is very likely that the attempt of reducing the intensity of the sonic boom would fail because the remaining continuous nose surface area would continue to generate such booms therefrom. However, the pattern of apertures 13 shown in FIG. 3 would not cause such booms because of the lack of a large unvented surface area.

The said concentric main venting surface 14 is essentially concentric at every point to the said fuselage skin 15. The said skin 15 and surface 14 are connected along the length of said aircraft 10 by means of a plurality of structural elements 18. As may be appreciated, the design and placement of said elements 18 are extremely important so as to avoid collapse of the said skin 15 relative to said surface 14. The said air 16, which has been channeled inside said fuselage 12, thus proceeds rearwardly along the length of said fuselage 12 between the confines of said skin 15 and surface 14.

Figure 2:
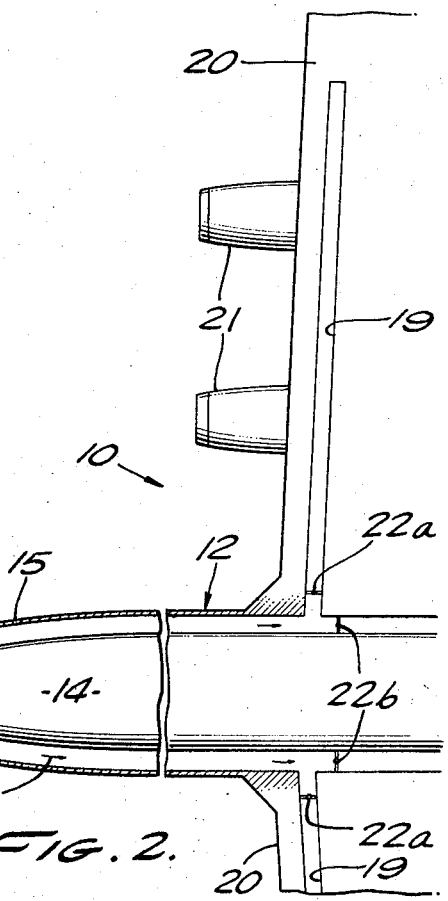
FIG. 2 is a partial cross-sectional view of the said aircraft taken along lines 2—2 of FIG. 1 of the drawing.

Another embodiment of the invention is shown in FIG. 2 of the drawing. Additional channels or tubes 19 are provided from the area within said skin 15 and surface 14 along a portion of the wings 20 of said aircraft 10 to the jet engine compressors 21. Thus, the said air 16 between said skin 15 and surface 14, which is in a state of overpressure, can be directed to the blades of said compressors 21 so as to drive same and substantially increase the efficiency of the jet engines.

The width of the passageway formed by said concentric surface 14 and skin 15 would vary depending upon factors such as the diameter of fuselage 12 of the aircarft 10, the percentage of desired reduction in the cross-sectional area of the nose surface 11, whether an air pump or similar device is to be utilized in said passageway and the remaining design considerations for each particular aircraft 10. Further, since the said concentric main venting surface 14 is convex to the impending supersonic air flow, such design tends to increase the speed of said air flow. AS a result, if it is desired to vent a portion or all of said air flow to said compressors 21, the efficiency thereof would be substantially increased. In any event, and as may be appreciated by viewing FIG. 2 of the drawing, if said channels or tubes 19 are utilized, then directional valves 22a and 22b are placed in the manner shown so as to control the air flow either along the length of said fuselage 12 or through said wings 20, or both.

Figure 3:
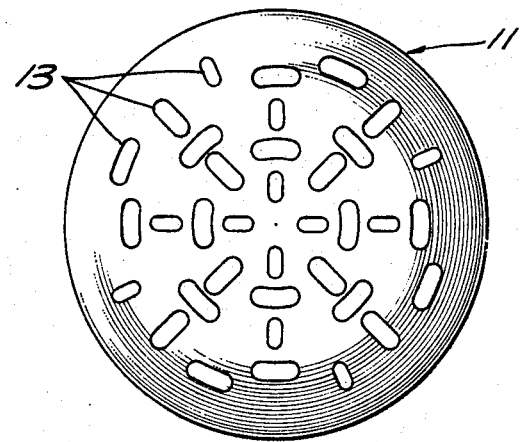
FIG. 3 illustrates the nose portion of said aircraft, which portion has a plurality of apertures thereon.

It is obvious that the apertures 13 shown in FIG. 3 of the drawing may be of numerous shapes and designs. In the embodiment shown, said apertures 13 have substantially straight sides and semicircular ends. However, it should be understood that the invention may include any particularly shaped configuration of the nose portion 11, any particularly shaped aperture 13, any reasonable placement of said apertures 13, random or otherwise, and any particular design of the channels 19 or structural elements 18.

After considerable analysis, it is believed that at a minimum, one-third of the effective area of the nose surface 11 can be vented by introduction of said apertures 13 without detracting in any way from the structural requirements for safe flights. Of course, the percentage of nose surface area 11 which can be vented depends initially on the configuration of said nose surface 11. Thus, if the aircraft 10 has a particularly streamlined nose 11, a greater percentage of the nose surface area 11 can be vented than if a blunt configuration is utilized. Further, since the surface area of said nose portion 11 is increased by streamlining the surface thereof, there is less pressure per square unit on such a designed nose 11. As a result, it may be possible to easily vent at least 50 percent of the effective surface area of the streamlined nose portion 11.

It has been found that the diameter of the fuselage 12 is also directly related to the intensity of the sonic boom generated by said aircraft 10. Thus, as the diameter of the fuselage 12 increases, the intensity will likewise increase. As a result, venting of the fuselage 12 becomes an important factor in the reduction of sonic boom intensity. As may be appreciated by viewing FIG. 4 of the drawing, a unique design for the combined venting of the nose surface 11 and the fuselage 12 is shown. An additional substantially concentric structural surface 23 is provided along the length of the fuselage 12 between said skin 15 and said inner concentric surface 14 and is connected to said skin 15 by a welding procedure or the like. Thus, two passageways are provided along the length of said fuselage 12, each adapted to receive substantial and continous volumes of high pressure air 16. The reason for said dual passageways is that at most speeds and for many aircraft the pressure of the air 16 vented from the nose surface 11 is higher than the pressure of the air 16 vented from the fuselage section 12. Consequently, in order to provide efficient venting of the fuselage surface 12, separate passageways are required so that the pressure differential at the apertures 13 on said fuselage 12 remains extremely high. The passageway adjacent the said fuselage skin 15 would then be utilized for venting only the fuselage 12 and air 16 received from venting said nose surface 11 would enter the passageway furthest from said skin 15. In such event, it is clear that pressure differentials in both passageways remain high so as to effectively provide the venting of air 16 as intended.

Figure 6:
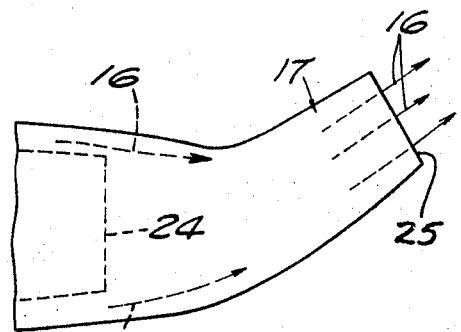
FIG. 6 is a partial view of the tail portion of said aircraft.
Figure 7:
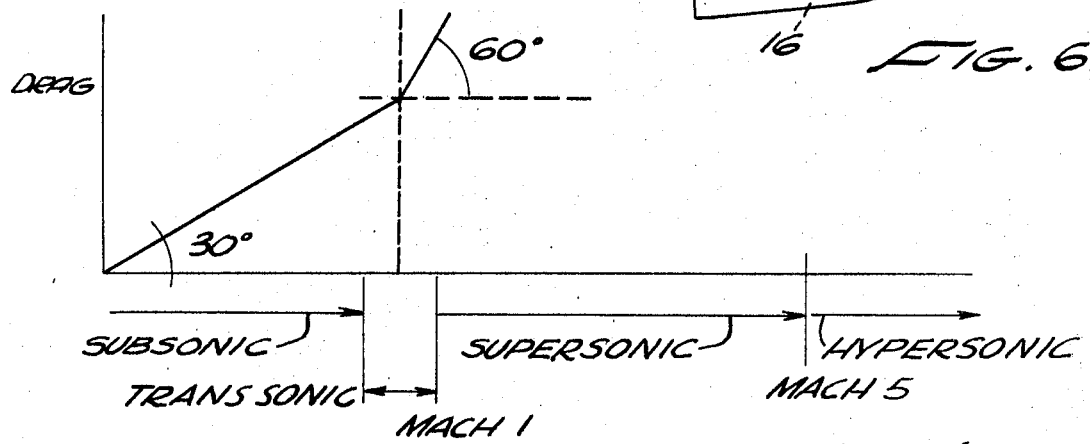
FIG. 7 illustrates the drag upon an aircraft as a function of its speed.

A unique design for the tail portion 17 of the aircraft 10 is shown in FIG. 6 of the drawing. It may be appreciated that the vented air 16, as it exits from the tail portion 17, can be upwardly directed into the higher altitudes by forming an upward turn in the said passageways prior to said emission. As a result, any sonic boom that might otherwise be generated by the vented air 16 would be directed opposite and away from the surface of the earth. Further, the passenger or baggage compartment 24 of said aircraft 10 is so placed that said portion 17 is substantially hollow and relatively large and in effect creates an expansion chamber thereto. This insures rapid and efficient removal of air 16 from said aircraft 10 in the manner hereinabove discussed.

Figure 8:
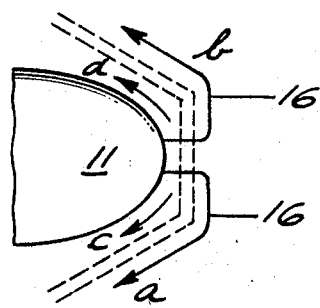
FIG. 8 illustrates the various air movements and energy paths at the nose portion of an aircraft once it is traveling at supersonic speed.

As mentioned above, the pattern of layout for the apertures 13 as shown in FIG. 3 of the drawing is illustrative only of one particular embodiment. However, it should be noted that for each aircraft 10 the pattern may vary according to particular nose configurations, hole sizes and shapes, actual effective cross-sectional area of the nose portion 11 and the desired percentage of area reduction thereto. The said apertures 13 clearly help absorb the sonic pressure that otherwise would be rearwardly along the fuselage 12 of said aircraft 10 so as to add supersonic drag thereto. Because of the placement of said apertures 13 uniformly about the surface of said nose portion 11, all of that sound energy travels into the boundary layer unimpeded on the fuselage section 12, as shown by c–d in FIG. 8 of the drawing. As a result, there is a substantial reduction of the supersonic draft upon the aircraft 10. The degree of reduction achieved will vary with the percentage of venting utilized, the efficiency of the aperture pattern, use of an air pump, and the like. In addition, by an appropriate design of the aperture pattern layout, as aforesaid, sonic boom eruptions which may be generated by the unvented surface of the nose portion 11 can be directed into said apertures 13 instead of the free atmosphere. For example, any unvented surface area on the nose portion 11 can be assumed to develop sonic booms. However, if there are sufficient apertures 13 adjacent said unvented area, the energy of said sonic booms will be directed through said apertures 13 into the aircraft 10, as aforesaid, due to the supersonic air flow that travels therein. Once said energy enters the passageways, as aforesaid, it can be advantageously dealt with as described above.

As indicated previously, a substantial over-pressure of air 16 is generated at the fuselage portion of said aircraft 10, and same is directly related to the total length of the longitudinal axis of the fuselage 10, the diameter of the fuselage 12 and its body shape, among other things. The following equation determines the sonic boom pressure developed at the fuselage 12 of an aircraft 10 exceeding the speed of sound:

$$\Delta P = K_1 K_2 \sqrt{P_a P_o} (M^2 - L)^{1/8} d/l(l/h)^{3/4}$$

P is the sonic boom pressure in pounds per square foot as measured at the ground; $K_1$ is ground condition, such as texture and elasticity; $K_2$ is the volume shape factor; $P_a$ is altitude pressure; $P_o$ is ground pressure; $M$ is aircraft speed in Mach; $d$ is the maximum body diameter; $l$ is the length of the aircraft; and $h$ is the altitude of the aircraft. As may be appreciated, the weight of the aircraft 10 is of no consequence. However, air pressure is an important consideration. Further, it may be seen that once supersonic speed is established, the speed of the aircraft 10 has only a small effect. For example, at speeds in excess of Mach 2, such speed causes only a very slight increase in boom pressure.

Figure 4:
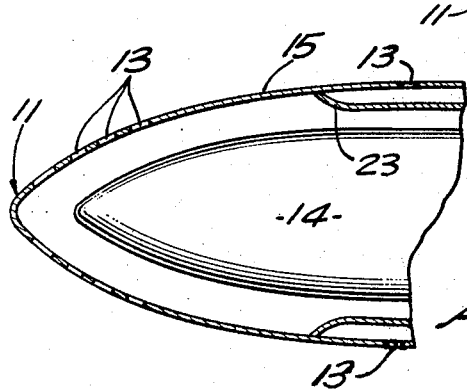
FIG. 4 is a cross-sectional view of the nose portion of one of the embodiments of the present invention.
Figure 9:
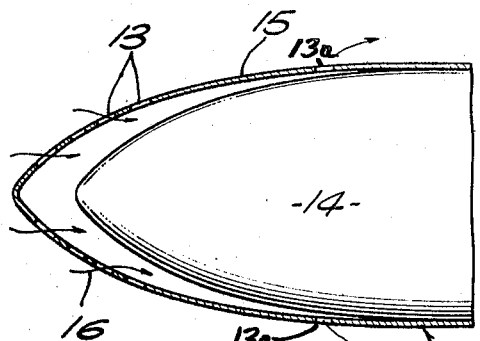
FIG. 9 is a cross-sectional view of the nose portion of another embodiment of the present invention.
Figure 5:
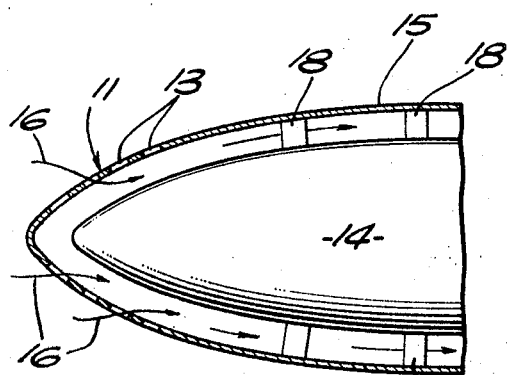
FIG. 5 is an enlarged view of the nose portion of said aircraft shown in FIG. 2, and includes certain structural elements hereinafter described.

It may now be appreciated that if either of the embodiments shown in FIG. 4 or 5 are utilized, the effective length of the fuselage 12 will be at least doubled thereby. The above equation indicates that the over-pressure condition at said fuselage 12 would thus be reduced. In addition, the percentage of surface reduction of said nose portion 11 likewise has the effect of increasing the effective length of said fuselage 12 since same determines the quantity of air pressure 16 that travels through said apertures 13 into passageways. Another embodiment of the present invention is shown in FIG. 9 of the drawing wherein exit apertures 13a are provided on the fuselage skin 15 substantially to the rear of the intake apertures 13. Thus, the continuous passageways along the length of the fuselage 12 are eliminated, but a substantial degree of venting of the surface area of said nose 11 remains. Finally, in the embodiment shown in FIG. 4 of the drawing, the structural surface 23 is convex, so as to efficiently increase the air flow through said passageways.

Consequently, said present invention is not intended to be restricted to any particular construction or arrangement, or any specific embodiment disclosed herein, or any specific method of operation or use, since the same may be modified in various particulars or relations without departing from the spirit or the scope of the claimed invention hereabove shown and described of which the embodiments are intended only for illustration and for disclosure of an operative embodient, and not to show all of the various forms and modifications in which the invention might be embodied.

I claim:

1. An aircraft adapted to fly faster than the speed of sound, said aircraft comprising: a fuselage having an outer surface and an inner surface coincident therewith but separated therefrom; means adapted to structurally connect said outer and inner surfaces so that said surfaces define a passageway for the streamflow of air, which passageway terminates at the tail portion of said aircraft; a plurality of apertures at the nose portion of said outer surface and situated thereon in such a manner as not to unduly interfere with the soundness of the aerodynamic structure of said aircraft; hollow channels provided within the wings of said aircraft and adapted to connect said passageway to engine compressors carried by said wings; valves integral within said channels and adapted to control the flow of air therethrough to said compressors, which air has theretofore entered the said passageway through said apertures from the exterior of said aircraft; and an exit port provided in the tail portion of said aircraft and adapted to permit the controlled discharge of the streamflow of air therefrom.

2. An aircraft structure as defined in claim 1 above, wherein the tail portion of said aricraft is substantially removed relative to the passenger and baggage area of said aircraft so that an expansion chamber is formed therebetween resulting in a substantial pressure differential within said passageway between the nose portion and exit port thereof.

3. An aircraft structure as defined in claim 1 above, wherein the said exit port is established in such a manner as to direct the streamflow of air therefrom in a predetermined direction relative to the longitudinal and horizontal axes of the said aircraft.

4. An aircraft structure as defined in claim 3 above, wherein the said exit port is established in such a manner as to be adapted to direct the streamflow of air therefrom in various directions at any particular time.

5. An aircraft structure as defined in claim 3 above, wherein the said outlet ports are placed in the tail portion of said aircraft and substantially removed from the passenger or baggage areas thereof so that an expansion chamber is formed thereby which results in a substantial pressure differential within said passageway between said nose portion and said ports.

6. An aircraft structure as defined in claim 1 above, wherein an additional surface is provided conincidentally with and between said outer surface and inner surface so that two passageways are defined within said aircraft, one passageway for reception of the streamflow of air through the said apertures of said nose portion, and the other passageway for reception of high pressure air from the said fuselage.

* * * * *